United States Patent [19]

Derman

[11] Patent Number: 5,027,627

[45] Date of Patent: Jul. 2, 1991

[54] LOCKING DEVICE FOR BOLTS AND STUD-NUTS

[76] Inventor: Jay S. Derman, 1201 N. Catalina Dr., Box 949, Redondo Beach, Calif. 90277

[21] Appl. No.: 638,079

[22] Filed: Jan. 7, 1991

Related U.S. Application Data

[62] Division of Ser. No. 555,854, Jul. 23, 1990, Pat. No. 5,010,748.

[51] Int. Cl.⁵ .............................................. F16B 41/00
[52] U.S. Cl. .................................... 70/164; 70/166; 70/DIG. 57
[58] Field of Search .................... 70/229–232, 70/DIG. 57, 158, 163, 164, 166

[56] References Cited

U.S. PATENT DOCUMENTS

| | | | |
|---|---|---|---|
| 206,228 | 7/1878 | Connolly | 70/164 X |
| 1,577,292 | 3/1926 | Obreiter | 70/232 |
| 1,912,872 | 6/1933 | Trautner et al. | 70/232 |
| 2,500,375 | 3/1950 | Parker | 70/232 |
| 3,600,912 | 8/1971 | Foreman | 70/230 X |
| 4,022,037 | 5/1977 | Walters | 70/DIG. 57 X |
| 4,117,700 | 10/1978 | Saunders | 70/DIG. 57 X |
| 4,567,741 | 2/1986 | Trempala | 70/DIG. 57 X |
| 4,779,434 | 10/1988 | Derman | 70/163 X |
| 4,862,716 | 9/1989 | Derman | 70/232 X |

FOREIGN PATENT DOCUMENTS

| | | | |
|---|---|---|---|
| 145823 | 6/1931 | Switzerland | 70/232 |
| 1290330 | 9/1972 | United Kingdom | 70/163 |

*Primary Examiner*—Lloyd A. Gall
*Attorney, Agent, or Firm*—Monty Koslover Assoc.

[57] ABSTRACT

A locking device for preventing access to a bolt or stud-nut which secures an equipment to a base. The device comprises three parts: a rectangular tube body, a slide member and a lock body. In use, the bolt is put through a hole in the tube body and the equipment, and tightened down. The slide member is then inserted in one end of the tube and slid over the head of the bolt or stud-nut and the lock body is inserted in the tube and locked by a key. This prevents the slide from being removed and prevents access to the bolt head or stud nut. The device is flat and compact, and may be used for a variety of applications where equipments are secured by bolts or stud-nuts, particularly in tight quarters.

7 Claims, 1 Drawing Sheet

LOCKING DEVICE FOR BOLTS AND STUD-NUTS

This application is a divisional application of Ser. No. 07/555,854 filed 07/23/90, now U.S. Pat. No. 5,010,748.

BACKGROUND OF THE INVENTION

A prior locking device for stud nuts is available. This is the "Stud Nut Locking Device" described in U.S. Pat. No. 4,862,716 by Jay. S. Derman. This device is intended primarily for locking spare tires and utilizes a rectangular section tube and a locking assembly that is inserted in the tube until it grasps the wheel stud nut. A cylindrical plug lock, when locked in position, prevents the locking assembly from releasing the wheel stud nut and prevents access to it. The device does not cover the nut from view and is not easily adaptable for locking the heads of bolts or nuts such as are used to hold down seats or other equipment. An improvement to the device, to make it more universally adaptable to the needs of bolted down equipment such as automobile seats and office equipment, would make the device more useful in combatting theft.

SUMMARY OF THE INVENTION

The invention comprises three metal parts: a rectangular tube body, a slide member and a lock. The tube body is designed to be flat and smooth surfaced, with two recessed portions in it for seating the lock and the head of a bolt or stud. The fastening bolt or stud is pushed through a hole in the tube body and tightened in place, with the bolt head or stud nut in one recessed portion of the tube body.

A sliding member is inserted in the tube body until it covers the bolt head. The lock is then inserted in the body and through a hole in the slide and locked in place with a key, thus preventing removal of the slide and access to the bolt head or stud nut which is covered by the slide.

Accordingly, it is a principal object of this invention to provide a device that will cover the head of a bolt or stud-nut, preventing access to it for unauthorized removal.

Another object is to provide a device that can be used for the locking against theft, of a range of automobile and office equipments. An advantage of the device is its simplicity and small size, enabling it to be used in tight quarters.

Further objects and advantages of the present invention will become apparent from the study of the following portion of the specification, the claims and the attached drawings.

DESCRIPTION OF THE PREFERRED EMBODIMENT

Figure 1:
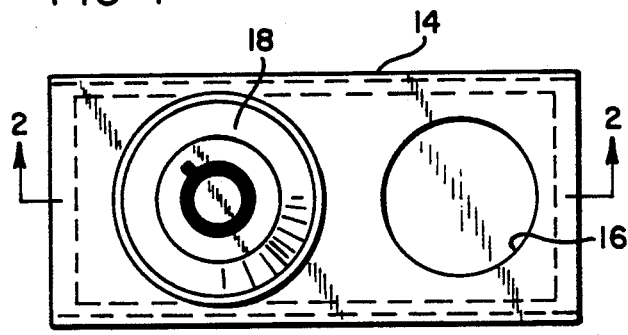
FIG. 1 is a plan view of the preferred embodiment of the present invention, showing it locked in place.
Figure 2:
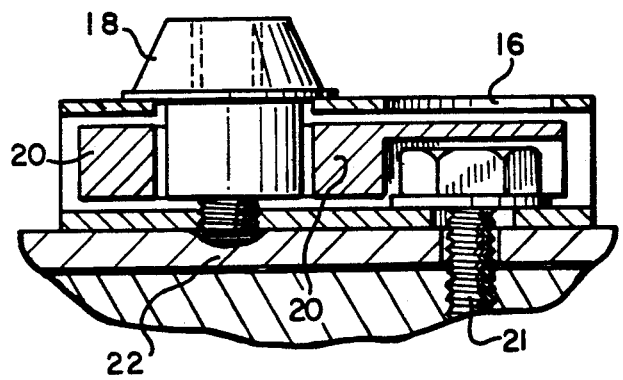
FIG. 2 is a side elevation cross-section view of the present invention locked in place, taken along line 2—2 of FIG. 1, particularly showing how the slide member which is inside the body, receives the lock and covers the bolt head or stud nut.

Referring particularly to the drawings, there is shown in FIGS. 1 and 2 the preferred embodiment of the present invention.

This embodiment has similarity to the prior invention described in U.S. Pat. No. 4,862,716, in that the embodiment also utilizes a rectangular tube body 14 and a slide 20 that acts together with a lock 18. In this improvement, the slide 20 extends to cover the head of the bolt 21 and does not need to grip the bolt head or nut. Further, by this configuration, the height of the tube body is made to be relatively low and flat as compared with the prior invention, making it compact and easier to fit into tight quarters.

The invention comprises three parts: a tube body 14, a slide member 20 and a lock 18. When the slide member 20 is in place as shown in FIGS. 1 and 2, it can be used to cover the head of a bolt 21 which fastens an equipment in place, or a stud which projects through an equipment, and has a nut, may be similarly covered.

The lock 18 is locked in place by a key which causes a threaded member part of the lock 18 to engage a tapped hole in the tube 14, securing the lock 18 in place. The lock 18 also passes through and abuts against the slide member 20 preventing its removal. The threaded member of the lock 18 protrudes underneath the device and pushes into the equipment 22 being secured, preventing the device from being rotated.

As shown, the device can be made to be small and compact, yet rugged, so that it may be used in areas with little space for locks. An example use, can be securing at least one bolt of a seat to an automobile to prevent theft. Another use, can be in securing computer equipment which is bolted to a surface such as a floor or table.

In FIGS. 1 and 2, the device is shown locked in place with the slide 20 covering the bolt head (or stud-nut) which is fastening down the equipment 22 to be protected. The tube body 14 is rectangular metal tubing or a high impact plastic material. The slide member 20 is similarly made of metal or a high impact plastic material. The lock 18 is a cylindrical barrel type which has been adapted in body size to the depth of the tube body 14 and has a threaded member.

Figure 3:
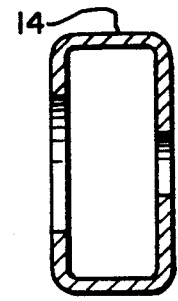
FIG. 3 is a cross-section view of the body, taken along line 3—3 of FIG. 2A.
Figure 2A:
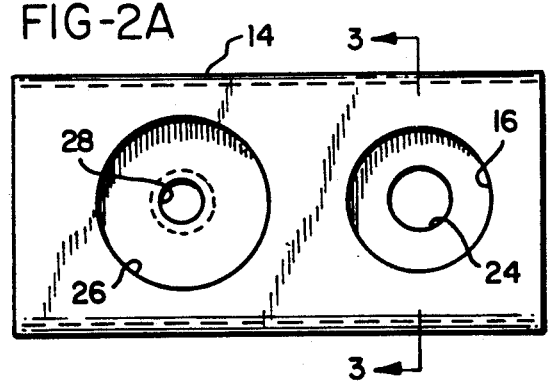
FIG. 2A is a top plan view of the body, showing the openings used to seat the lock and a bolt head or stud-nut.

Refer now to FIGS. 2A and 3 which show respectively a plan top view of the tube body 14, and a cross-section view taken across line 3—3 of FIG. 2A. The tube body 14 is divided into two portions: The first portion at the left, is adapted to fit and engage a lock 18, whereas the second portion at the right is adapted to seat the head of a bolt or stud nut. A first hole 16 and a second hole 26 are cut in the top longitudinal surface of the tube body 14, and third 28 and fourth 24 holes are cut in the bottom surface for the purpose of seating the lock 18 and for seating a bolt head or nut. The third hole 28 below, is made concentric with the second hole 26 above, and tapped to mate with the threaded member of the lock 18. The FIG. 3 cross-section view shows that the surface of the tube body 14 is flat and smooth, other than the hole cuts.

Figure 4:
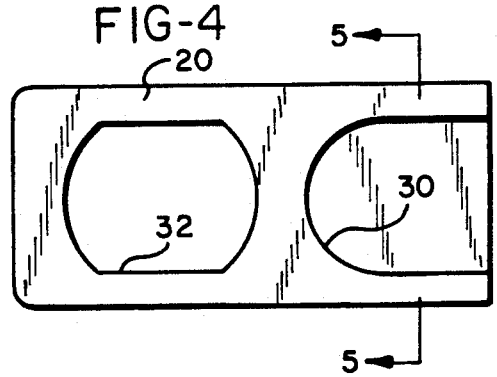
FIG. 4 is a bottom plan view of the slide.
Figure 5:
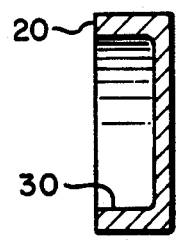
FIG. 5 is a cross-section view of the slide taken along line 5—5 of FIG. 4, and particularly showing the recessed area used for covering a bolt head or stud-nut when the slide is in place.

FIGS. 4 and 5 are, respectively, a bottom plan view of the slide member 20 and a cross-section view showing the recessed area 30. The slide 20 is sized to be inserted and fit snugly inside the tube body 14. An opening 32 is cut in the slide member 20 to accommodate the lock 18 and engage with it. At least one side of the opening 32 is flattened and the remaining sides are curved. The flattened side 32 matches with a flattened surface on the body of the lock 18 when the slide 20 is inserted in the tube body 14 and the lock 18 is assembled in place. A recessed area 30 is formed in the bottom of the slide 20 at one end to cover a bolt head or stud-nut. The recess 30 is partially cup-shaped as shown in the cross-section view of FIG. 5, and extends for most of the thickness of the slide 20, allowing for maximum coverage.

Figure 6A:
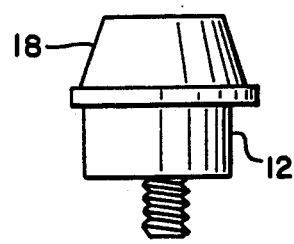
FIGS. 6A and 6B are respectively side elevation and bottom views of the lock, particularly showing a flat surface ground in the body for use in abutting the slide member.
Figure 6B:
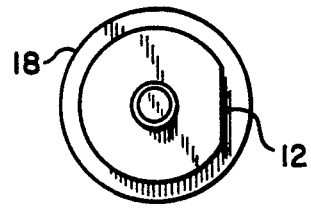

Referring now to FIGS. 6A and 6B, it is seen that the lock 18 has a threaded member and a flat 12 ground on one side of its body. This flat surface 12 abuts the flat edge 32 of the slide member 20 when all three parts of the device are assembled as in FIGS. 1 and 2, to cover a bolt head or nut in place.

From the above descriptions of the preferred embodiment of the invention, it is believed that the embodiment achieves the objects of the present invention.

Some modifications of the embodiment described herein may be apparent to those skilled in the art. These modifications are considered to be within the spirit and scope of the present invention.

What is claimed is:

1. A locking device for bolts and studs comprising:
   a tube body made of rectangular tubing and divided into first and second portions; the first said portion adapted to seat and engage a lock, and the second said portion adapted to seat the head of a bolt or stud having a stud-nut;
   a slide member, sized and shaped to fit inside said tube body through either end with sliding clearance; said slide member having an opening allowing a lock body to pass through it, and having a separate recessed portion located to cover the head of a bolt or stud-nut when said slide is inserted in said tube body; and
   a lock body to fit in said first portion of said tube body and having a threaded member for securing to said tube body; said lock, when placed in said tube body, through the lock opening in said slide member and, using a key, secured by its threaded member to said tube body, preventing the removal of said slide member which covers said bolt head or stud-nut, thereby preventing access to said bolt head or stud-nut.

2. A locking device as in claim 1 wherein said tube body is made of metal tubing or a high-impact plastic material.

3. A locking device as in claim 1 wherein said first portion of said tube body defines a first hole cut in the top longitudinal surface and a fourth hole cut in the bottom longitudinal surface and concentric with said first hole; said second portion of said tube body is spaced apart from said first portion and defines a second hole cut in the top longitudinal surface, and a third hole cut in the bottom longitudinal surface and concentric with said second hole; said third hole being sized for clearance of a bolt or stud.

4. A locking device as in claim 3 wherein said fourth hole in said tube body is tapped with a thread sized to match the threaded member of said lock.

5. A locking device as in claim 1 wherein said lock body has at least one flat surface on its tubular body, said flat surface enabling said lock body to be engaged and retained by said slide member.

6. A locking device as in claim 1 wherein said lock opening in said slide member is shaped with at least one flat edge and remaining curved edges, in order to engage a flat surface in said lock body and prevent said lock body from rotating.

7. A locking device as in claim 1 wherein said threaded member of said lock body extends beneath said tube body and protrudes into a surface of equipment being secured by the device, thereby preventing rotation of the device.

* * * * *